United States Patent [19]

Stanley

[11] Patent Number: 4,969,704
[45] Date of Patent: Nov. 13, 1990

[54] POSITIONING DEVICE AND A HERMETICALLY SEALED PACKAGE FORMED THEREFROM

[75] Inventor: Ian W. Stanley, Ipswich, England

[73] Assignee: British Telecommunications public limited company, London, England

[21] Appl. No.: 312,589

[22] PCT Filed: May 23, 1988

[86] PCT No.: PCT/GB88/00405
§ 371 Date: Feb. 1, 1989
§ 102(e) Date: Feb. 1, 1989

[87] PCT Pub. No.: WO88/09519
PCT Pub. Date: Dec. 1, 1988

[30] Foreign Application Priority Data

May 22, 1987 [GB] United Kingdom ............... 8712119

[51] Int. Cl.$^5$ .............................................. G02B 6/26
[52] U.S. Cl. ............................. 350/96.20; 350/96.18
[58] Field of Search ........................... 350/96.18, 96.20

[56] References Cited

U.S. PATENT DOCUMENTS 4,222,629 9/1980 Dassele et al. ................... 350/96.20
4,355,321 10/1982 Yeats ............................ 350/96.18 X
4,690,487 9/1987 Hale et al. ..................... 350/96.18 X
4,768,199 8/1988 Heinen et al. ................. 350/96.20 X

FOREIGN PATENT DOCUMENTS 0121402 10/1984 European Pat. Off. .
8605596 9/1986 European Pat. Off. .
8202800 8/1982 PCT Int'l Appl. .

OTHER PUBLICATIONS

7th European Conference on Optical Communication, Conference Proceedings, Sep. 8th–11th Sep. 1981, Copenhagen, pp. P13-1–P13-4; G. Kuyt et al., "Metal Sealed Hermetic Laser Diode Package Suitable for Direct Single-Mode Fibre Coupling".
Patent Abstracts of Japan, vol. 6, No. 147 (E-123)[1025], Aug. 6, 1982; & JP-A-57 69 792 (Nippon Denki K.K.).
Patents Abstracts of Japan, vol. 9, No. 56 (E0302)(1779), Mar. 12, 1985 & JP, A, 59197184 (Nippon Denki K.K.) Nov. 8, 1984.
IBM Technical Disclosure Bulletin, vol. 20, No. 5, Oct. 1977, (New York, U.S.), J. D. Crow: "Integral Source/Receiver Package for Optical Data" pp. 2089–2090.

Primary Examiner—William L. Sikes
Assistant Examiner—Phan T. Heartney
Attorney, Agent, or Firm—Nixon & Vanderhye

[57] ABSTRACT

A hermetically sealed package (20) for an optical device (7) has a wall (21) which is formed partly by a positioning device (1) soldered to the wall (21). The positioning device (1) allows a fibre (4) to be aligned with the optical device (7) on either side of a transmissive window (3).

15 Claims, 2 Drawing Sheets

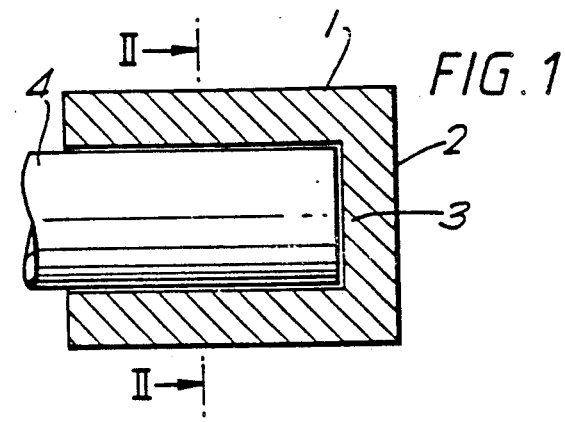
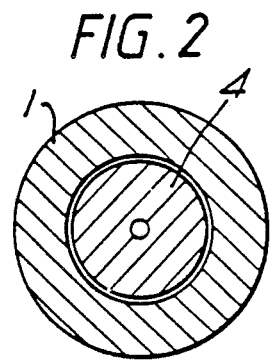
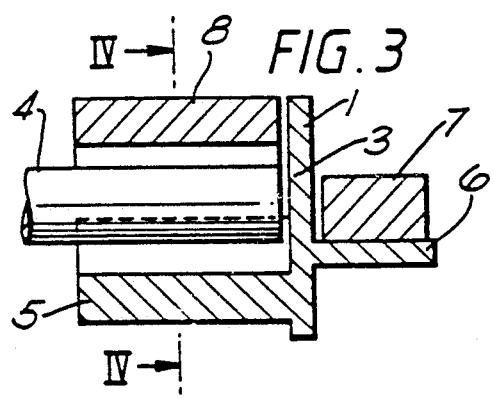
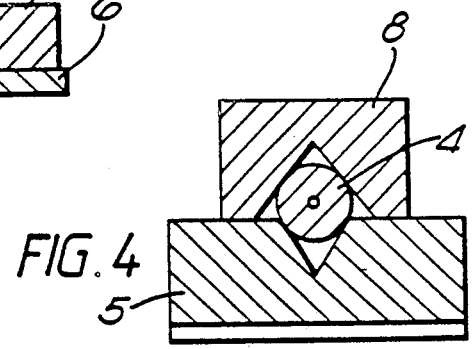
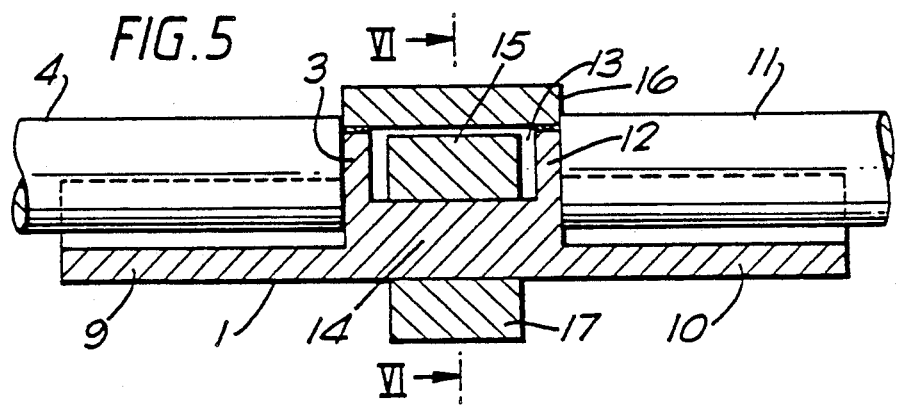

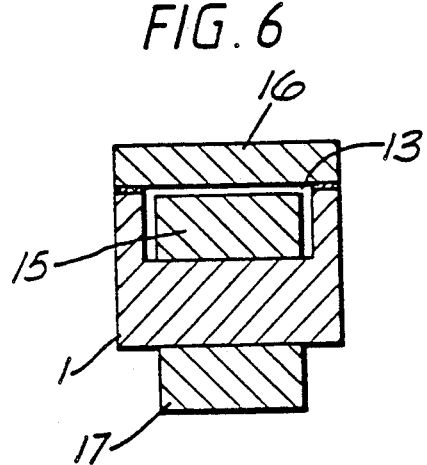
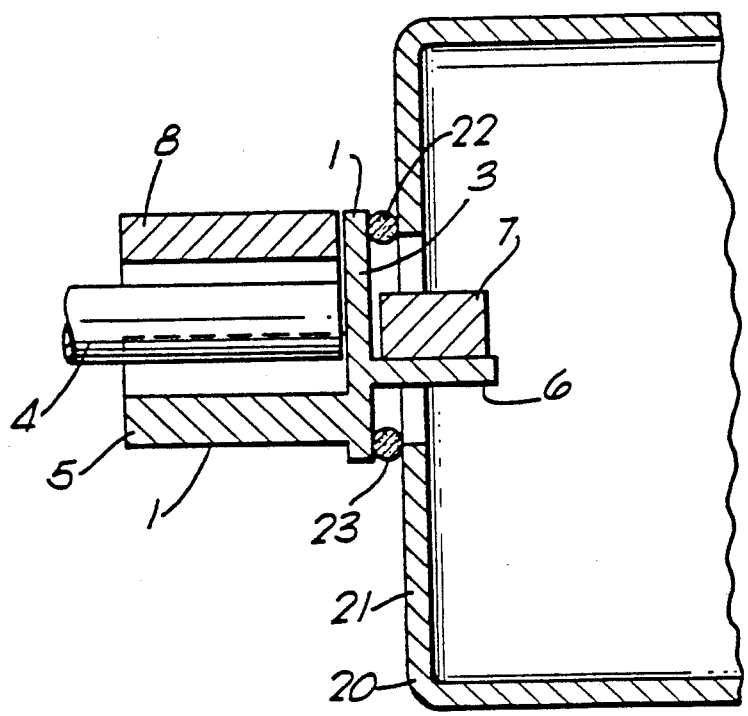

POSITIONING DEVICE AND A HERMETICALLY SEALED PACKAGE FORMED THEREFROM

FIELD OF THE INVENTION

This invention relates to a positioning device for positioning one or more optical devices relative to a transmissive window.

BACKGROUND OF THE INVENTION

It necessary for many semi-conductor devices to be packaged in a hermetically sealed environment, and so any connections into the package need to pass through a hermetically sealed feed-through. Optical fibres may be used where it is necessary to conduct light to or from a package, in which case the fibre needs to be close to the device and has to pass through the package wall. The fibre itself needs to be sealed to the feed-through because otherwise there is a leakage path along the fibre between the fibre and the usual protecting sheath. Sealing the fibre to the feed-through presents problems; firstly the fibre is delicate and can be damaged by the handling processes of stripping, metalising and soldering that are typical in the preparation of feed-through, and then, once the protecting sheath is removed the fibre may be subject to stress unless the sheath is also secured to the feed-through to maintain continuity of strength and covering for the fibre.

A known method of overcoming these problems is to incorporate a transmissive window with the package device arranged to transmit or receive light through it but this has been found to cause difficulty in aligning the internal and external devices.

SUMMARY OF THE INVENTION

It is an object of the present invention to provide a device which largely overcomes the alignment problems.

According to a first aspect of the present invention there is provided a positioning device comprising a single crystal and having a transmissive window portion having first and second sides oppositely disposed, which is transparent to predetermined wavelengths, and a first locating portion for locating a first optical device in a fixed position relative to the first side of the window portion.

By forming the positioning device from a single crystal, the locating portion and the window portion are in a fixed position relative to one another. The first optical device is therefore also located in a fixed position relative to the window portion.

Preferably, there is a second locating portion for locating a second optical device in a fixed position relative to the second side of the window portion.

Two optical devices may thus be located in a fixed position relative to the window portion, and also relative to one another.

The window may subsequently be made into a package such that the first optical device is external to the package, and the second optical device is internal to the package.

This reduces the problems of aligning the first optical device with the window portion and alignment with the second optical device within a package can be obtained by accurate fixing of the positioning device to the package.

Conveniently, the first optical device is an optical fibre, and the second optical device is a semi-conductor device.

The window portion is transparent to wavelengths corresponding to the wavelength response or emission wavelength of the semi-conductor device. The fibre and semi-conductor device may thus be located relative to the window and to one another such that light emitted from the semi-conductor device passes through the window and is coupled to the fibre. Alternatively, light may be emitted from the fibre, pass through the window and be incident on the semi-conductor device.

Where the first optical device is an optical fibre the window portion may conveniently be formed by a thin region at the end of the bore in the single crystal block, the walls of the bore forming the first locating portion. The diameter of the bore is such that the fibre may be push-fitted into it. Once inside the bore, the bore acts as a support for the fibre.

Alternatively, the first locating portion may be in the form of a V-groove in the single crystal block. The groove may be formed by using chemical etching processes, for example.

The device to be sealed in a package is generally mounted on a planar surface. The second locating portion may therefore be in a form of ledge. The second optical device may then be placed on the ledge to be located relative to the window and so also to the first optical device external the package.

The positioning device may have a second window portion spaced apart from the first window portion, the second locating portion for connecting the first and second window portions and for supporting the second optical device there between and for locating the second optical device in a fixed position relative to the first and second window portion.

Preferably, the first and second windows form opposite sides of a cavity. The second optical device is thus located in the cavity which may be sealed to form a package simply by adding further single block to form a top for the cavity. When the device is incorporated into a package the first, second and third optical devices are all aligned.

Conveniently, the third optical device is an optical fibre, and the second optical device is an optical amplifier. It is thus possible to align two optical fibres and an optical amplifier such that light may be emitted from the first optical fibre such that it passes through the first window and is incident upon the optical amplifier. The optical amplifier will then emit light which passes through the second window and is incident upon the second optical fibre.

According to a second aspect of the present invention, there is provided a positioning device according to the first aspect of the invention having means which form a hermetically sealed package enclosing the second optical device, wherein the or each window forms part of the said package.

The positioning device may be manufactured remote from the package, and the first and second optical devices may be aligned relative to the window and to one another prior to manufacture of a package according to the second aspect of the invention. The positioning device with the first and second optical devices may then be incorporated into a package.

BRIEF DESCRIPTION OF THE DRAWINGS

The invention will now be described by way of example only with reference to the accompanying drawings in which:

FIG. 1 is a sectional view through a positioning device according to the invention suitable for locating an optical device with respect to a window portion;

FIG. 2 is a cross section of the device of FIG. 1 along the axis II—II;

FIG. 3 is a sectional view of a positioning device according to the invention suitable for locating a first and a second optical device with respect to the window portion;

FIG. 4 is a cross section of the device of FIG. 3 along the axis IV—IV;

FIG. 5 is sectional view of a positioning device according to the invention suitable for locating three optical devices with respect to two window portions;

FIG. 6 is a cross section of the device shown in FIG. 5 along the axis VI—VI;

FIG. 7 is a sectional view of a device package incorporating the positioning device of FIG. 3 and 4.

DETAILED DESCRIPTION OF A PRESENTLY PREFERRED EXEMPLARY EMBODIMENT

Referring to FIG. 1, a positioning device 1 is formed from a single crystal of silicon. The positioning device is in the form of a bore, the end 2 of which forms a transmissive window 3. The thickness of the window is about 10 to 30 microns. The remainder of the bore acts as a support for an optical fibre 4 which is positioned within the bore. When in position, the fibre 4 is located in a fixed position relative to the window 3. The cross sectional formation of the device one is shown in FIG. 2. The diameter of the bore is arranged to be slightly larger than the diameter of the fibre, in order that the fibre just fits inside the bore, and is held in the desired location.

Referring now to FIGS. 3 and 4, a second embodiment of the invention is illustrated. A positioning device 1 formed from a single crystal of silicon comprises a fibre receiving support 5, which is in the form of a V-groove. The V-groove 5 is adapted to receive a fibre 4 such that the fibre is located in a fixed position relative to the window 3. In addition, the positioning device 1 has a ledge 6 formed integrally with the rest of the device. The ledge 6 is adapted to support an optical device 7 such that the device 7 is located in fixed position relative the window 3. The device 7 may be a light emitting device such a laser chip. The positioning device 1 is shaped such that the optical axis of the device 7 is coaxial with the optical axis of the fibre 4. The window 3 is transparent to wavelengths corresponding to emission wavelengths of the device 7. Light emitted by the device 7 is transmitted through the window 3 to the fibre 4. A separate silicon block 8 formed into a V-groove of similar dimensions to that of the V-groove 5 may be placed on top of the fibre 4 in order to hold it more securely in place. The cross sectional configuration of the device is shown in FIG. 4. The end of the fibre 4 is preferably lensed and anti reflection coated and located close to the window 3 so that the spacing from the fibre end to the device 7 is less than about 50 microns, and in order to reduce attenuation the window is coated with an anti reflection coating.

Referring to FIGS. 5 and 6 a third embodiment of the invention is illustrated. The positioning device 1 comprises a first fibre receiving support 9 formed as V-groove, and which is adapted to locate a fibre 4 in a fixed position relative to a window 3. The device further comprises a second fibre receiving support 10 formed as V-groove adapted to locate a second fibre 11 in a fixed position relative to a second window 12. The positioning device 1 is shaped to form a cavity 13 comprising a support 14 on which an optical device such as optical amplifier 15 may be located in a fixed position relative to the windows 3 and 12. The configuration of the positioning device 1 is such that the optical axis of the fibre 4, fibre 11, and optical amplifier 15 are coaxial. A further block 16 of silicon may be soldered to windows 3 and 13 in order to form a hermetically sealed container inside which the optical amplifier 15 is positioned. A heat sink 17 may be attached to the support 14 in order to dissipate any heat generated by the optical amplifier.

Referring to FIG. 7, a device package is shown which incorporates the positioning device of FIGS. 3 and 4. A device package 20 comprises a package wall 21 a part of which is formed by the positioning device 1. The positioning device 1 is soldered at 22 and 23 to the package wall 21 thus forming a hermetically sealed package 20. The optical device 7 is thus hermetically sealed.

Within the context of this specification "optical" refers to not only the visible region of the electromagnetic spectrum that also includes ultra-violet and infrared radiation, and especially include that part having a wavelength greater that 1.1 microns.

I claim:

1. A positioning device comprising a single crystal:
   said single crystal having a transmissive window portion having first and second sides oppositely disposed and transparent to predetermined wavelengths,
   said single crystal also having a first locating portion for locating a first optical device in a fixed position relative to the first side of the window portion, and
   said single crystal further having a second locating portion for locating a second optical device in a fixed position relative to the second side of the window portion.

2. A device according to claim 1 wherein: said single crystal also has a second window portion spaced apart from the first window portion,
   the second locating portion connecting the first and second window portions and for supporting the second optical device therebetween and for locating the second optical device in a fixed position relative to the first and second window portions.

3. A device according to claim 2 wherein:
   said single crystal includes a third locating portion disposed on the opposite side of the second window portion with respect to the second locating means for locating a third optical device.

4. A device according to claim 1, 2 or 3 including as the first optical device an optical fibre.

5. A device according to claim 3 including as the first and third optical device respective 1 optical fibers.

6. A device according to claim 1, 2 or 3 wherein the or each window portion is transparent to wavelengths corresponding to the wavelength response or emission wavelengths of the second optical device.

7. A device according to claim. 5, wherein the first window portion is formed by a thin region at the end of a bore in a single crystal block, the bore forming the first locating portion by being adapted to receive a fibre.

8. A device according to claim 5 wherein each window portion is formed by a thin region at the end of a bore in a single crystal block, the bores forming the first and third locating portions respectively by being adapted to receive a fibre.

9. A device according to any one of the preceding claims 1, 2 or 3 wherein the first locating portion is in the form of a V-groove.

10. A device according to claim 5 wherein the first and third locating portions are each in the form of a V-groove.

11. A device according to any one of claims 1, 2 or 3 wherein the second locating portion is in the form of a ledge.

12. A device according to any one of claims 1, 2 or 3 wherein the second optical device is a laser chip.

13. A device according to any one of the preceding claims 1, 2 or 3 comprising means which form a hermetically sealed package enclosing the second optical device, wherein the or each window forms part of the said package.

14. A single crystal formed to include:
an optically transmissive window,
a positioning structure for positively locating an optical fibre end with respect to a predetermined location on a first side of said window,
a further positioning structure for locating an optical signal processing device with respect to a second side of said window,
a second optically transmissive window disposed adjacent said further positioning structure and opposite said first window, and
a third positioning structure disposed adjacent said second optically transmissive window for locating a further optical fiber end with respect to said second window.

15. A single crystal as in claim 14 hermetically sealed to an aperture in a wall of a package housing an optical signal processing device.

* * * * *